United States Patent [19]

Miihkinen et al.

[11] Patent Number: 5,059,233
[45] Date of Patent: Oct. 22, 1991

[54] METHOD AND APPARATUS FOR MANUFACTURING A BENT GLASS SHEET

[75] Inventors: Veijo T. T. Miihkinen, Tampere; Jorma T. Leppänen, Moisio, both of Finland

[73] Assignee: Tamglass Oy, Tampere, Finland

[21] Appl. No.: 556,526

[22] Filed: Jul. 24, 1990

[30] Foreign Application Priority Data

Aug. 11, 1989 [FI] Finland .................. 893793

[51] Int. Cl.⁵ ........................................... C03B 23/023
[52] U.S. Cl. ......................................... 65/104; 65/106; 65/107; 65/273; 65/287
[58] Field of Search .................. 65/104, 106, 107, 273, 65/287, 289

[56] References Cited

U.S. PATENT DOCUMENTS 2,223,124  11/1940  Owen ...................................... 65/289
4,881,962  11/1989  Reunamaki et al. ................... 65/107

Primary Examiner—Joye L. Woodard
Attorney, Agent, or Firm—Burns, Doane, Swecker & Mathis

[57] ABSTRACT

The invention relates to a method and apparatus for manufacturing a bent glass sheet. A glass sheet (9) carried by rollers (7) included in a furnace (1) is transferred onto rollers (8) of a bending mould (10) included in a mould station (3) built as a part of the furnace. By adjusting the position of rollers (8) of bending mould (10) in vertical direction a glass sheet is bent to a desired curvature while heating it in furnace mould station (3). The roller mould (10), along with its bent glass sheet (9'), is carried out of furnace (1) and into a chilling station. When using a transferable and adjustable roller mould (10), the apparatus does not set limitations for the size or degree of bending of glass sheets to be bent.

12 Claims, 4 Drawing Sheets

METHOD AND APPARATUS FOR MANUFACTURING A BENT GLASS SHEET

BACKGROUND

The present invention relates to a method for manufacturing a bent glass sheet, said method comprising heating a glass sheet in a furnace upon rotating rollers, bringing a glass sheet onto a bending mould located in the furnace, bending a glass sheet in the furnace by curving the configuration of the bearing surface of the bending mould, and carrying the bending mould out of the furnace after a bending operation and into a chilling section together with a curved glass sheet.

The invention relates also to an apparatus for manufacturing a bent glass sheet, said apparatus comprising a furnace provided with a conveyor formed by rotating rollers and heating means for heating a glass sheet carried on the rollers close to a softening temperature, and a mould station fitted inside the furnace and provided with a bending mould having a curveable bearing surface, said mould being transferable out of the furnace while carrying a glass sheet bent to a given curvature.

The bending of architectural glass is becoming more popular but the bending/tempering of large glasses has been problematic in an effort to achieve a sufficient capacity.

This problem has been resolved with the invention in a manner that the bending of a glass sheet is effected in a furnace upon an adjustable roller mould which is carried out of the furnace for tempering and/or chilling. The characterizing features of a method of the invention are set forth in more detail in the annexed claim 1 and the characterizing features of an apparatus are set forth in claim 10.

Prior known is the bending of a glass sheet in a furnace by using curved rollers or rolls. However, such a method has been restricted to the bending of small glasses and the bending of large building glasses (e.g. 2×3 mm) e.g. to an arch corresponding to a 90° sector is not possible.

For example, U.S. Pat. Nos. 3,846,104 and 4,437,871 disclose the bending of a glass sheet in a furnace between shaping surfaces, the upper shaping surface serving also as a vacuum pickup. A glass sheet is carried upon the mould from the furnace to an annealing operation. Such particular mould structures are suitable for bending rather small glass sheets such as windshields but not for bending major architectural glasses to a curvature with a rather large sector angle.

U.S. Pat. No. 2,223,124 discloses the bending of a glass sheet with a roller mould by adjusting the position of rollers in vertical direction. The rollers are not associated with a displaceable roller mould but are disposed in a space for effecting therein both heating and tempering. Since a glass sheet is heated and tempered in one and the same space, the apparatus is not fit for continuous production but, instead, is very slow indeed. It is not capable of a capacity required by modern production.

Prior known is also a bending/tempering operation effected outside a furnace by using a curveable roller conveyor as a bending mould (EU 0261611). Also this method is restricted to the production of relatively small glass sheets and is not suitable for manufacturing the above-described large bent glasses. In addition, especially the bending of thin glass sheets cannot be managed with an acceptable tempering result as thin glass will be necessarily cooled before a tempering blast is started.

A method and apparatus of the invention are capable of eliminating the above limitations and drawbacks.

BRIEF DESCRIPTION OF THE DRAWINGS

One embodiment of the invention will now be described in more detail with reference made to the accompanying drawings, in which.

DESCRIPTION

Figure 1:
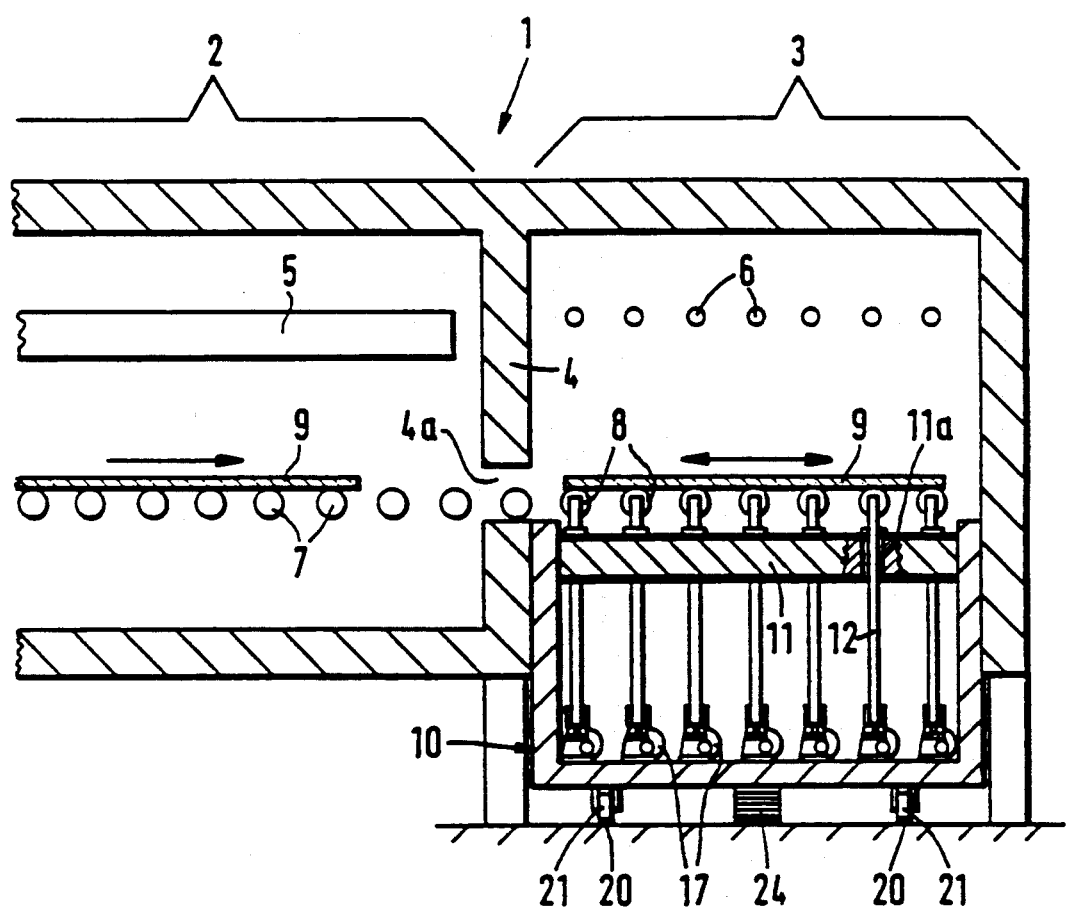
FIG. 1 shows the downstream end of a glass-bending furnace of the invention in a vertical section at the outset of a bending operation.
Figure 2:
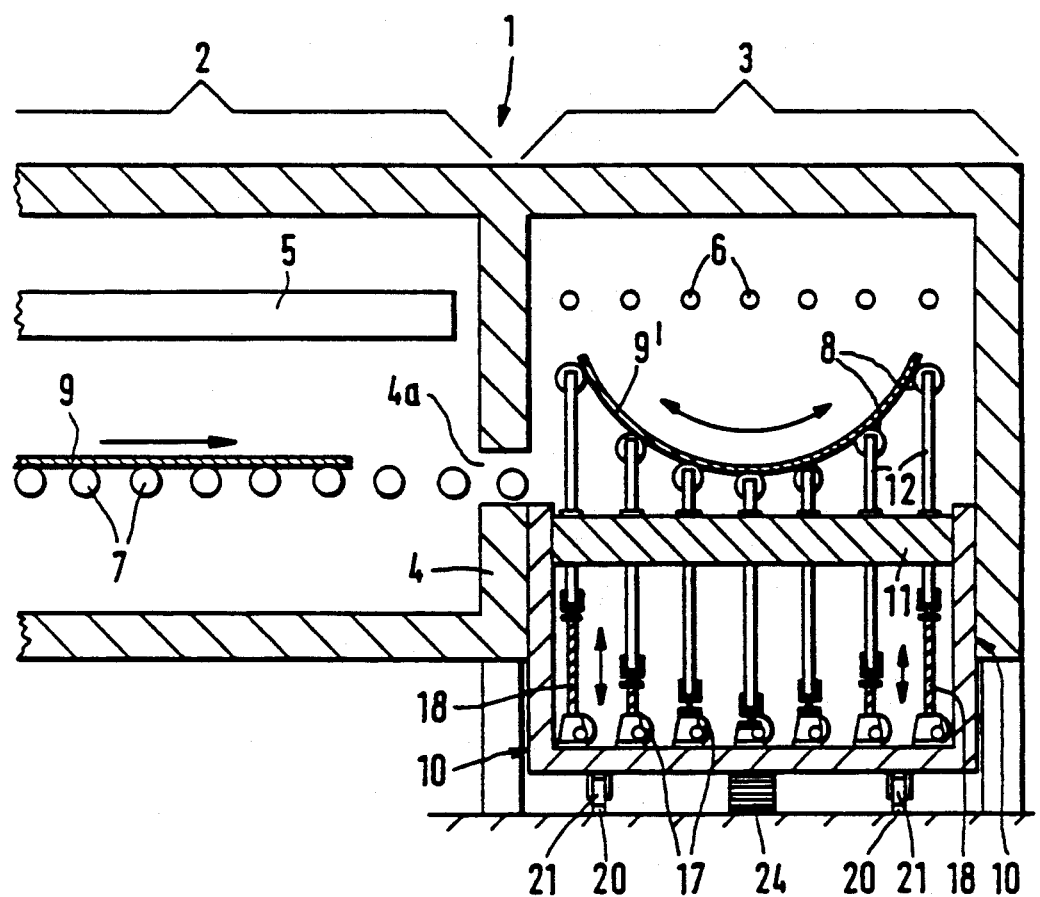
FIG. 2 shows the same as FIG. 1 but at the finishing stage of a bending operation.

A furnace 1 is divided with a partition 4 into two sections 2 and 3. The furnace section 2 includes longitudinal heating resistances 5 and the furnace section 3, which serves as a mould station for receiving a bending mould 10, includes transverse heating resistances 6. The heating resistances 6 are mounted on the top section of mould station 3 and adapted, if necessary, to be capable of applying the heat to a desired point either by using a matricewise adjustable resistance zone or movable heating resistances or a combination thereof. Naturally, it is also possible to employ convection heat (hot-gas blowing) for applying the heat to a desired area on a glass sheet 9 being bent.

In the furnace section 2, a glass sheet 9 is carried on a conveyor formed by rollers 7. The rotation of rollers 7 is preferably reciprocal with glass sheet 9 also moving back and forth i.e. it is oscillating. The stroke length of this oscillating movement can be equal in both directions or the stroke can be longer in advancing direction, whereby successive glass sheets are gradually indexing forward in furnace section 2 while oscillating at the same time.

Through an opening 4a said glass sheet 9 can be advanced into mould station 3 which includes a bending mould 10 having its rollers 8 substantially level with other rollers 7 located in furnace 1. Thus, rollers 8 participate in forwarding a glass sheet 9 and the glass sheet can be transferred directly onto rollers 8 of roller mould 10 with a single advancing stroke during which the rotation of rollers 7 and 8 is synchronized to the same peripheral speed. However, the invention is not limited to this case but, instead, said rollers 8 of roller mould 10 can also extend in the longitudinal direction of furnace 1. This requires, however, separate transfer roller systems between rollers 7 and 8 or some other separate transfer mechanism (e.g. a suction pad carrier) for bringing a glass sheet upon roller mould 10.

Figure 4:
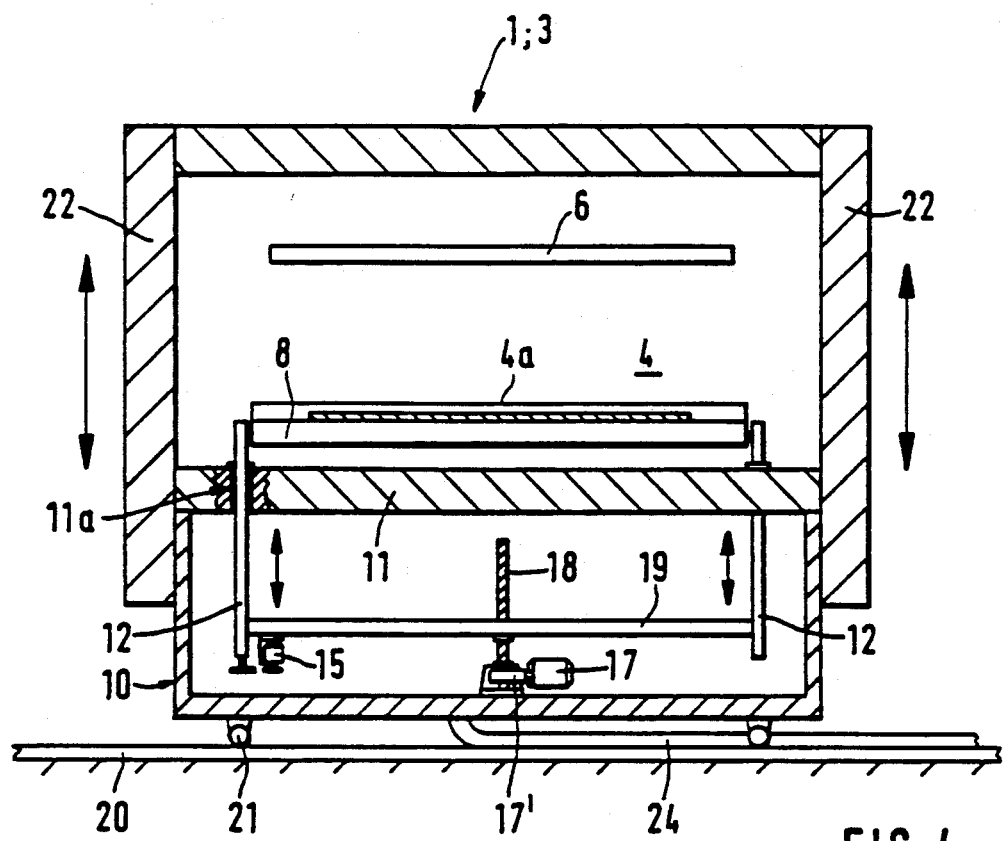
FIG. 4 shows a mould station included in a bending furnace in cross-section.

The rollers 8 of roller mould 10 are adjustable in vertical direction in a manner that the configuration thereof form a desired arch, e.g. a segment or segments of a circular arc. Rollers 8 are supported at the ends thereof by means of movable rods 12. Rods 12 extend through an insulating floor 11 included in mould 10, the actuators for operating said rods 12 and for driving said rollers 8 being located beneath that floor. As shown in FIG. 4, the bottom portions of rods 12 associated with the opposite ends of roller 8 are connected with a beam 19 provided with a threaded sleeve for engaging the threading of a lifting screw 18. A pulse-controlled stepped motor 17 drives said lifting screw 18 through the intermediary of a gear 17'.

Figure 5:
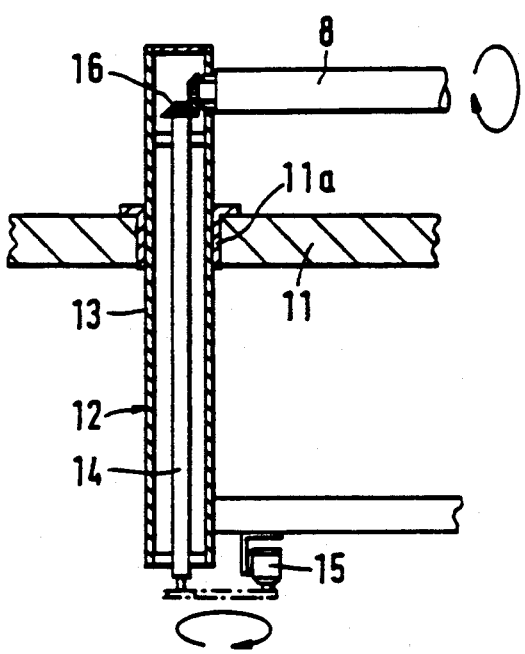
FIG. 5 shows a driving mechanism for a bending mould roller.

As shown in FIG. 5, said rod 12 comprises a sleeve 13 having a shaft 14 rotatably journalled therein. The shaft 14 is driven by an electric motor 15 and the rotating motion is transmitted to roller 8 by a bevel gear 16.

Figure 3:
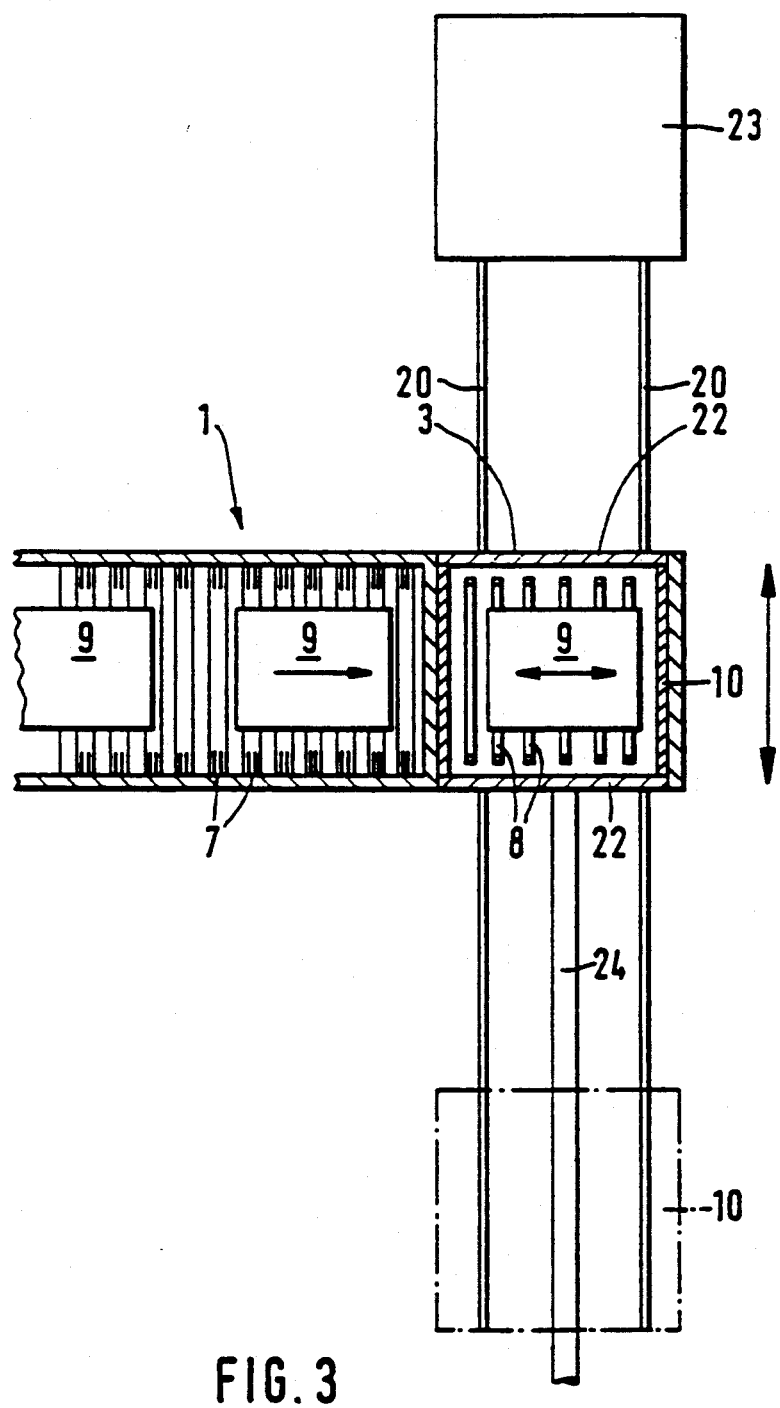
FIG. 3 shows the apparatus schematically in plan view and partially cut away.

Said actuators for driving rollers 8 and for adjusting a vertical position are all mounted and fitted on a common frame for providing a separate, displaceable bending mould 10 whose rollers 8 make up a glass-sheet bearing shaping surface. The roller mould 10 is mounted by means of wheels 21 on rails 20 for carrying the roller mould therealong out of the mould station 3 of furnace 1 and into a tempering and chilling station 23 (FIG. 3). The electric power and control required by roller mould 10 is supplied by means of a flexible cable 24.

The mould station 3 is provided with side walls 22 adapted to be ascendable and descendable in vertical direction for carrying roller mould 10 out of mould station 3. When said roller mould 10 is positioned outside mould station 3, another roller mould 10 can be brought over to replace the first roller mould in mould station 3. Alternatively, if just one roller mould 10 is employed, with said roller mould partially or completely outside mould station 3, said mould station 3 can be provided with a heat-transfer preventing flat interlayer to replace roller mould 10, said layer being located close to the level of rollers in the vertical direction of the furnace. Thus, the interlayer would primarily serve the same purpose as floor 11 (without lead-in bushings 11a).

When a flat glass sheet 9 to be bent has been carried onto the rollers 8 of a bending mould 10 included in mould station 3 (FIG. 1), the lifting of rollers 8 is initiated at a lifting speed matching a desired final curvature while said rollers 8 are rotated back and forth during bending. This oscillating motion obtained in a glass sheet 9' by means of the reciprocal rotating motion of rollers 8 can be totally independent of the oscillating motion of the other section 2 of furnace 1 produced by rollers 7. Thus, a glass sheet 9' to be bent can be oscillated through a distance substantially shorter than that covered by a glass sheet supported on rollers 7. Thus, it is possible to minimize the number of rollers 8 as well as the number of separate mechanisms required for their operation.

The above-described structure makes it possible to adjust the vertical position of rollers 8 independently of each other. Thus, the motors 17 are each separately controlable by means of a control program, whereby the bending can be effected to any desired curvature while the curving speed of various sections of a glass sheet can be freely selected. Thus, the only dependence between the controls of motors 17 is that required by a control program which is freely selectable and variable by means of a digital control program.

It is quite obvious that the invention is not limited to the above embodiment but its structural design can be varied in many ways. For example, the lifting mechanism of rollers 8 can be provided with a motor 17 at both ends of rollers 8, or a single motor 17 can drive two lifting screws 18 which are mounted directly in connection with rods 12.

We claim:

1. A method for manufacturing a bent glass sheet comprising the steps of:
   heating a glass sheet in a furnace, said glass sheet being supported on rotating rollers in said furnace;
   positioning said heated glass sheet onto a bending mould, said bending mould being located in said furnace;
   bending said heated glass sheet in the furnace by curving a bearing surface of said bending mould, said bearing surface including a plurality of rotating rollers, said curving being achieved by adjusting the position of said rollers in a substantially vertical direction such that ending positions of said rollers give said bearing surface a predetermined curved configuration; and
   carrying said bending mould out of said furnace and into a chilling section with said curved glass sheet being supported on said rollers of said bending mould.

2. A method for manufacturing a bent glass sheet as set forth in claim 1, wherein during bending of said heated glass sheet, said bending mould is positioned in a mould station of said furnace, said mould station being separated from an adjacent section of said furnace by a partition, said glass sheet being heated in said mould station prior to and during said bending step.

3. A method for manufacturing a bent glass sheet as set forth in claim 2, wherein at least some of said rollers are reciprocally rotated so as to give said glass sheet a corresponding reciprocating motion.

4. A method for manufacturing a bent glass sheet as set forth in claim 2, wherein prior to bending said heated glass sheet, rollers of said bending mould located in a moulding station are positioned substantially level with other rollers of said furnace and said rollers of said bending mould cooperate with said other rollers to move said heated glass sheet forward in said furnace.

5. A method for manufacturing a bent glass sheet as set forth in claim 2, wherein during bending of said heated glass sheet, said rollers of said bending mould are rotated in a reciprocal motion independent of rotating reciprocal motion of other rollers of said furnace.

6. A method for manufacturing a bent glass sheet as set forth in claim 5, wherein said reciprocating rotating motion of said rollers of said bending mould oscillates said heated glass sheet through a shorter distance than does the reciprocating rotating motion of said other rollers.

7. A method for manufacturing a bent glass sheet as set forth in claim 2, wherein after carrying said bending mould outside of said mould station of said furnace, an additional bending mould is carried into said mould station.

8. An apparatus for manufacturing a bent glass sheet comprising:
   a furnace;
   a conveyor formed of rotatable drive rollers disposed in said furnace;
   means for heating a glass sheet to a softening temperature as said glass sheet is carried on said conveyor;
   a mould station disposed in said furnace;
   a bending mould transferable into and out of said mould station while supporting said glass sheet, said bending mould having a curvable bending surface for bending said glass sheet to a predetermined curvature;

said curvable bending surface formed of mould rollers which are each adjustable in a substantially vertical direction such that said surface is formable to said predetermined curvature; and means for transferring said bending mould out of said furnace to a chilling station.

9. An apparatus for manufacturing a bent glass sheet according to claim 8, wherein said mould station is separated from an adjacent section of said furnace by a partition means for reducing air circulation in said furnace when said bending mould is transferred out of said mould station.

10. An apparatus for manufacturing a bent glass sheet according to claim 8, wherein said bending mould includes means for driving said rollers and means for vertically adjusting said rollers and said means for transferring the bending mould out of said mould station includes rails.

11. An apparatus for manufacturing a bent glass sheet according to claim 8, wherein each of said mould rollers of said bending mould includes a means for independently adjusting said roller in a substantially vertical direction.

12. An apparatus for manufacturing a bent glass sheet according to claim 11, wherein each of said means for independently adjusting includes drive motors separately controllable by a control program.

* * * * *